(12) United States Patent
Webb

(10) Patent No.: US 7,096,814 B1
(45) Date of Patent: Aug. 29, 2006

(54) VARIABLE BUOYANCY DEVICE

(76) Inventor: Douglas C. Webb, 769 Palmer Ave., Falmouth, MA (US) 02540

( * ) Notice: Subject to any disclaimer, the term of this patent is extended or adjusted under 35 U.S.C. 154(b) by 0 days.

(21) Appl. No.: 11/323,613

(22) Filed: Dec. 31, 2005

Related U.S. Application Data

(60) Provisional application No. 60/641,344, filed on Jan. 4, 2005.

(51) Int. Cl.
*B63G 8/00* (2006.01)

(52) U.S. Cl. ................................. 114/312; 114/357
(58) Field of Classification Search ............ 441/1; 114/312, 357
See application file for complete search history.

(56) References Cited

U.S. PATENT DOCUMENTS

| | | | |
|---|---|---|---|
| 3,157,145 A | 11/1964 | Farris et al. | |
| 3,400,848 A | 9/1968 | Shaler et al. | |
| 3,429,758 A * | 2/1969 | Young | ............ 156/79 |
| 3,490,638 A | 1/1970 | Elliott et al. | |
| 3,598,275 A | 8/1971 | Francols | |
| 3,608,767 A | 9/1971 | Elliott | |
| 3,611,966 A * | 10/1971 | Hunter | ............ 114/341 |
| 4,077,577 A * | 3/1978 | Wright | ............ 156/428 |
| 4,693,281 A * | 9/1987 | Creedon | ............ 138/174 |
| 4,728,224 A * | 3/1988 | Salama et al. | ............ 405/224.2 |
| 5,244,016 A * | 9/1993 | Kuroda et al. | ............ 138/103 |
| 5,249,997 A | 10/1993 | Nance | |
| 5,261,462 A * | 11/1993 | Wolfe et al. | ............ 138/130 |
| 5,291,847 A | 3/1994 | Webb | |
| 5,348,052 A | 9/1994 | Crane et al. | |
| 5,460,556 A | 10/1995 | Logan et al. | |
| 5,806,457 A | 9/1998 | Gauthier et al. | |
| 5,947,940 A * | 9/1999 | Beisel | ............ 604/526 |
| 6,085,799 A * | 7/2000 | Kodaissi et al. | ............ 138/135 |
| 6,123,114 A * | 9/2000 | Seguin et al. | ............ 138/124 |
| 6,807,856 B1 | 10/2004 | Webb | |
| 2004/0072485 A1 | 4/2004 | Quigley et al. | |

* cited by examiner

*Primary Examiner*—Stephen Avila
(74) *Attorney, Agent, or Firm*—John P. McGonagle

(57) ABSTRACT

The method of constructing a hull for ocean profiling or gliding vehicles which reduce the energy required to make vertical excursions. Composite materials are used in constructing the hull, specifically a fiber reinforced matrix, wherein the choice of the fiber material and orientation allows a balance of strength and elastic properties optimized for oceanic profilers and gliders thereby allowing operations with minimum energy expenditure.

5 Claims, 5 Drawing Sheets

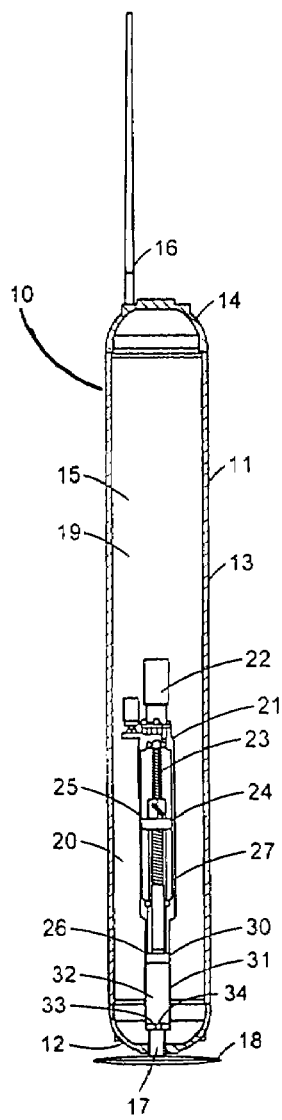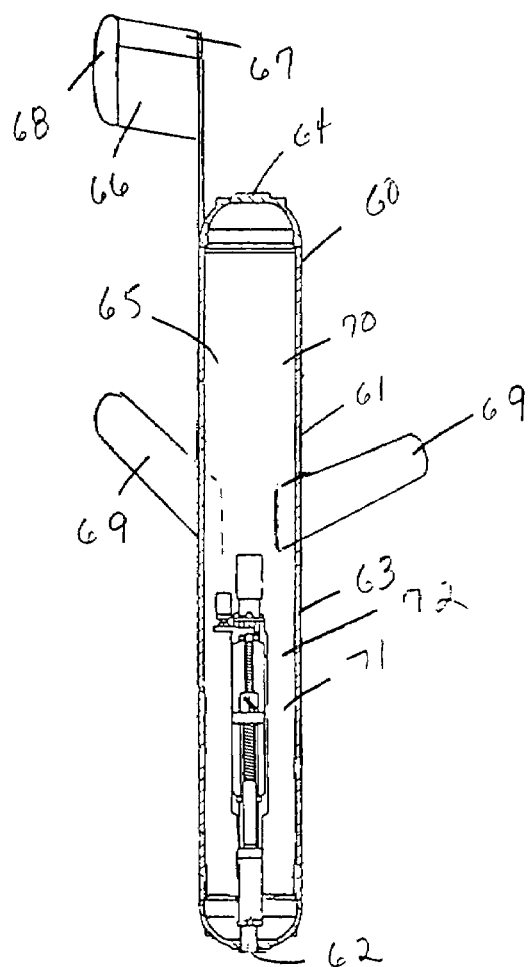
FIG. 1
FIG. 2

VARIABLE BUOYANCY DEVICE

CROSS-REFERENCE TO RELATED APPLICATIONS

Applicant claims the priority benefits of U.S. Provisional Patent Application No. 60/641,344, filed Jan. 4, 2005.

BACKGROUND OF THE INVENTION

This invention relates to oceanographic instrumentation, and more particularly to autonomous devices which cycle vertically and repeatedly between the surface and a desired depth in the ocean.

To observe the ocean environment there is a class of deep submergence vehicles that move freely (no physical connection to surface or bottom). Some profile vertically between the surface and resting in stable equilibrium at depth, i.e., "profilers." Others do not seek a stable equilibrium depth, instead they cycle vertically continuously, i.e., "gliders." It is desirable that these vehicles, with their observational payload, be small and inexpensive. In the case of profilers, the vehicle should be capable of hundreds of profiles moving efficiently between a stable equilibrium depth, typically 2000 meters (m), and the surface over a period of several years. Gliders are in continuous motion and it is desirable to cycle vertically many hundreds of times with minimum work expended.

Commonly profiler and glider designs use a metal hull, typically an aluminum alloy, with an active buoyancy mechanism having a pump or displacer powered by an on-board energy supply. An example of a profiler is described in U.S. Pat. No. 6,807,856 (Webb). An example of a glider is described in U.S. Pat. No. 5,291,847 (Webb). Most cylindrical, metallic, pressure resistant hulls designed to operate at substantial depth have an increase in buoyancy as depth is increased, i.e., their compressibility is less than sea water.

The goal of the present invention is to minimize the energy required for vertical excursions by using a hull design in which the compressibility, pressure resistance, and buoyancy can be independently optimized.

The invention embraces two similar vehicle types. Those that have a static stable equilibrium at depth, commonly called profilers, and those that are in continuous vertical motion, typically gliders. Both vehicle classes benefit from a compressibility optimized for minimum energy expenditure and maximum buoyancy.

SUMMARY OF THE INVENTION

The present invention provides a means of minimizing the energy required during a vertical ascent-descent cycle by independently optimizing the compressibility and pressure resistance of the hull of a profiler or glider to match the oceanic environment in which they operate.

The present invention exploits the use of composite materials, specifically a fiber reinforced matrix, where the choice of the fiber material and orientation allows a balance of strength and elastic properties optimized for oceanic profilers and gliders thereby allowing operations with minimum energy expenditure. The present invention enables the construction of pressure resistant, cylindrical hulls of a wide range of compressibility and pressure resistance enabling minimum energy expenditure to change depth.

The anisotropic characteristic of filament wound composites is exploited by means of judicious choices of winding angles as well as choices of fiber and matrix materials and cylinder wall thickness. The elasticity of filament wound material is stiff in the direction of the fibers and more compliant in orthogonal directions. By carefully designing and controlling the construction of cylinders, especially the winding helix angle, strong housings of a wide range of compressibility are practical.

The present invention results in designs of deep submergence vehicles that are propelled vertically through a water column with minimum energy expenditure and results in profilers and gliders of greater endurance, reduced size, smaller displacement pumps, and reduced cost. The invention also permits the choice of strong materials of low density which improves the energy payload capacity of a profiler or glider.

The primary purpose, therefore, of the present invention is to create an enclosure or hull for a profiling or gliding vehicle which reduces the energy required to make vertical excursions, by optimum choice of fiber material and orientation in a composite hull. This goal is achieved by designing the hull to have optimum compressibility, the desired compressibility being less, equal to or greater than the compressibility of water.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

FIG. 1 illustrates a cross-section of a typical ocean profiler.

FIG. 2 illustrates a cross-section of a typical ocean glider.

DETAILED DESCRIPTION OF THE INVENTION

Figure 3A:
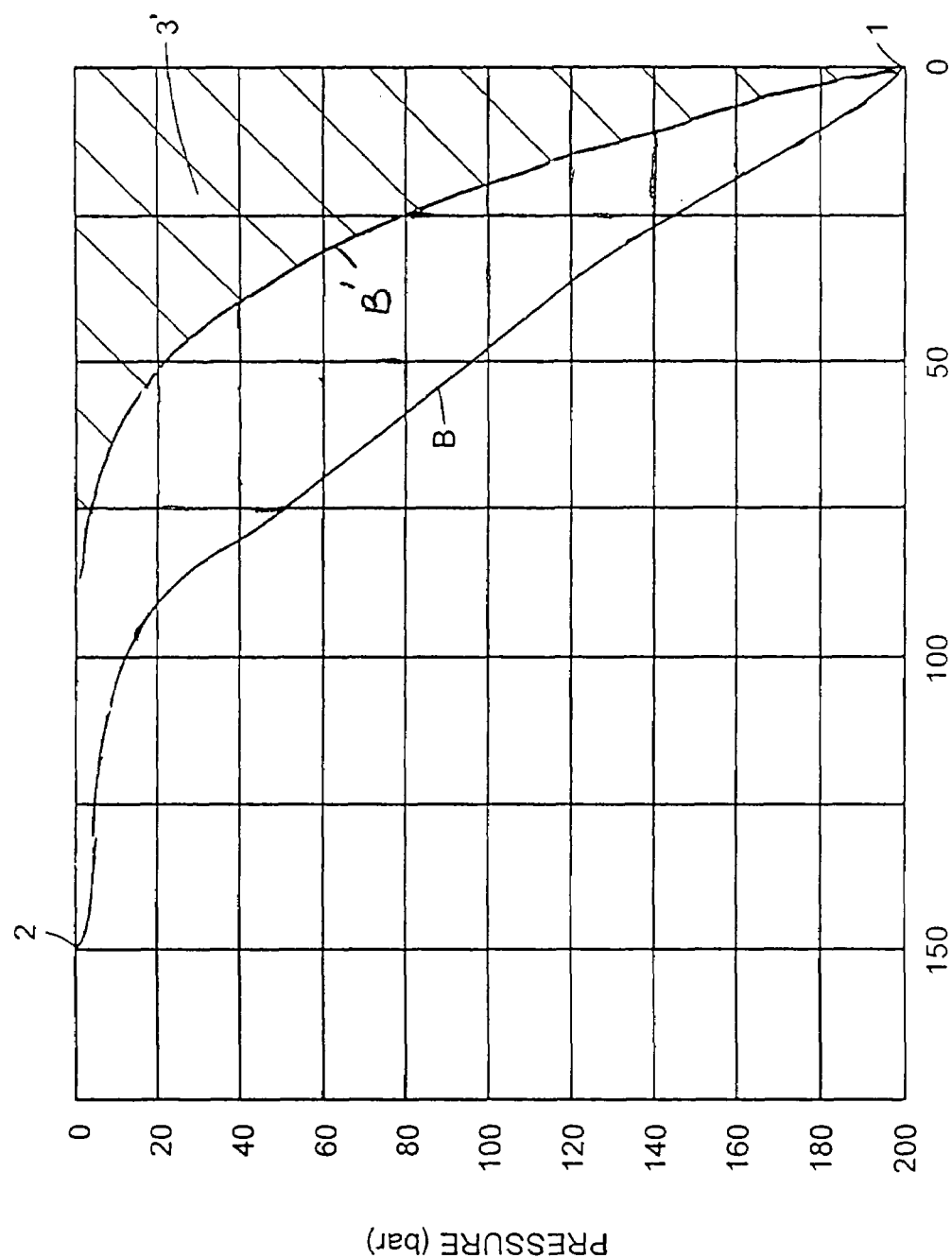
FIG. 3A illustrates graphically the change of buoyancy of a profiler composite hull in comparison with an aluminum hull.

Referring to the drawings in detail wherein like elements are indicated by like numerals, there is shown in FIG. 1 a cross-section of a typical ocean profiler 10. This ocean profiler 10 is suitable for operation to a pressure of 200 bars (approximately 2,000 meters depth in the ocean) and typically 250 vertical profiles. A bar is a unit of pressure. The ocean profiler 10 has a pressure hull 11 having a bottom closure 12 from which a cylindrical side wall 13 extends vertically upward terminating in a top 14, said pressure hull 11 being generally cylindrical in shape, said top 14 and bottom 12 defining a pressure hull longitudinal axis. The top 14, bottom 12 and side wall 13 define a pressure hull interior 15. The pressure hull 11 is typically made from an aluminum alloy. The pressure hull top 14 has an elongated radio antenna 16 extending vertically upward from said pressure hull top 14, said antenna 16 having a longitudinal axis parallel with the longitudinal axis of the pressure hull 11. The purpose of the radio antenna 16 is to transmit ocean profiler data, such as salinity, temperature, pressure and geographical position, to a satellite. The pressure hull bottom 12 has an aperture 17 formed therein opening out into an external flexible bladder 18 attached to the pressure hull bottom 12.

The pressure hull interior 15 is comprised of an upper portion 19 and a lower portion 20. The upper portion 19 contains batteries, electronic equipment and controllers. The lower portion 20 contains the pumping system 21. The batteries, electronic equipment, controllers, and buoyancy control equipment are distributed within the pressure hull interior 15 so that the profiler 10 has a center of gravity below the profiler center of buoyancy, thereby causing the profiler 10 to maintain a vertical orientation within water.

There is shown in FIG. 2 a cross-section of a typical ocean glider 60. This ocean glider 60 is suitable for operation to a pressure of 150 bars (approximately 1,500 meters depth in the ocean) and typically 500 vertical profiles. The ocean glider 60 has a pressure hull 61 having a bottom 62 from which a cylindrical side wall 63 extends vertically upward terminating in a top 64, said pressure hull 61 being generally cylindrical in shape, said top 64 and bottom 62 defining a pressure hull longitudinal axis. The top 64, bottom 62 and side wall 63 define a pressure hull interior 65. The pressure hull 61 is typically made from an aluminum alloy. The pressure hull top 64 terminates in a vertical stabilizer 66, having a rudder 67 and antenna 68. The purpose of the radio antenna 68 is to transmit ocean data, such as salinity, temperature, pressure and geographical position, to a satellite or nearby ship. The pressure hull 61 has two wings 69 extending generally laterally from the hull. The vertical stabilizer 66 is in a plane perpendicular to the plane of the wings 69.

The pressure hull interior 65 is comprised of an upper portion 70 and a lower portion 71. The upper portion 70 contains batteries, electronic equipment, navigational and measurement subsystems, and controllers. The lower portion 71 contains a pumping system 72.

FIG. 3A shows the typical ocean profiler 10 in equilibrium at 200 bars at 1. This means that the profiler 10 is negatively buoyant anywhere above 200 bars; is positively buoyant below 200 bars; and, therefore, is in equilibrium at 200 bars. For the profiler 10 to ascend from point 1 to point 2, i.e., profile, the profiler displacement volume must be increased.

The purpose of the present invention is to reduce the work expended to profile. The present invention does this by replacing the typical, present day cylindrical hull made from an aluminum alloy with a cylindrical composite hull constructed of strong and stiff linear filaments embedded in an appropriate matrix, e.g., graphite filaments in an epoxy resin matrix. FIG. 3A illustrates a buoyancy profile comparison of a profiler aluminum hull (B) and a profiler composite hull (B') and is based upon a typical temperate North Atlantic ocean site in June. The vertical axis indicates pressure (depth) in bars. The horizontal axis shows buoyancy in milliliters of water displaced for a 25 kg profile. The aluminum hull buoyancy profile B uses an aluminum hull designed for 2,000 meter depth and having a compressibility of 2.6e–5 per bar of pressure. The composite hull profile B' illustrates a composite hull having a compressibility of 4.0e–5 per bar of pressure. The work 3' done for the composite hull to ascend is the area above and to the right of the curve B'. As shown in FIG. 3A, the composite hull requires only approximately 47% of the work required by the aluminum hull.

Figure 3B:
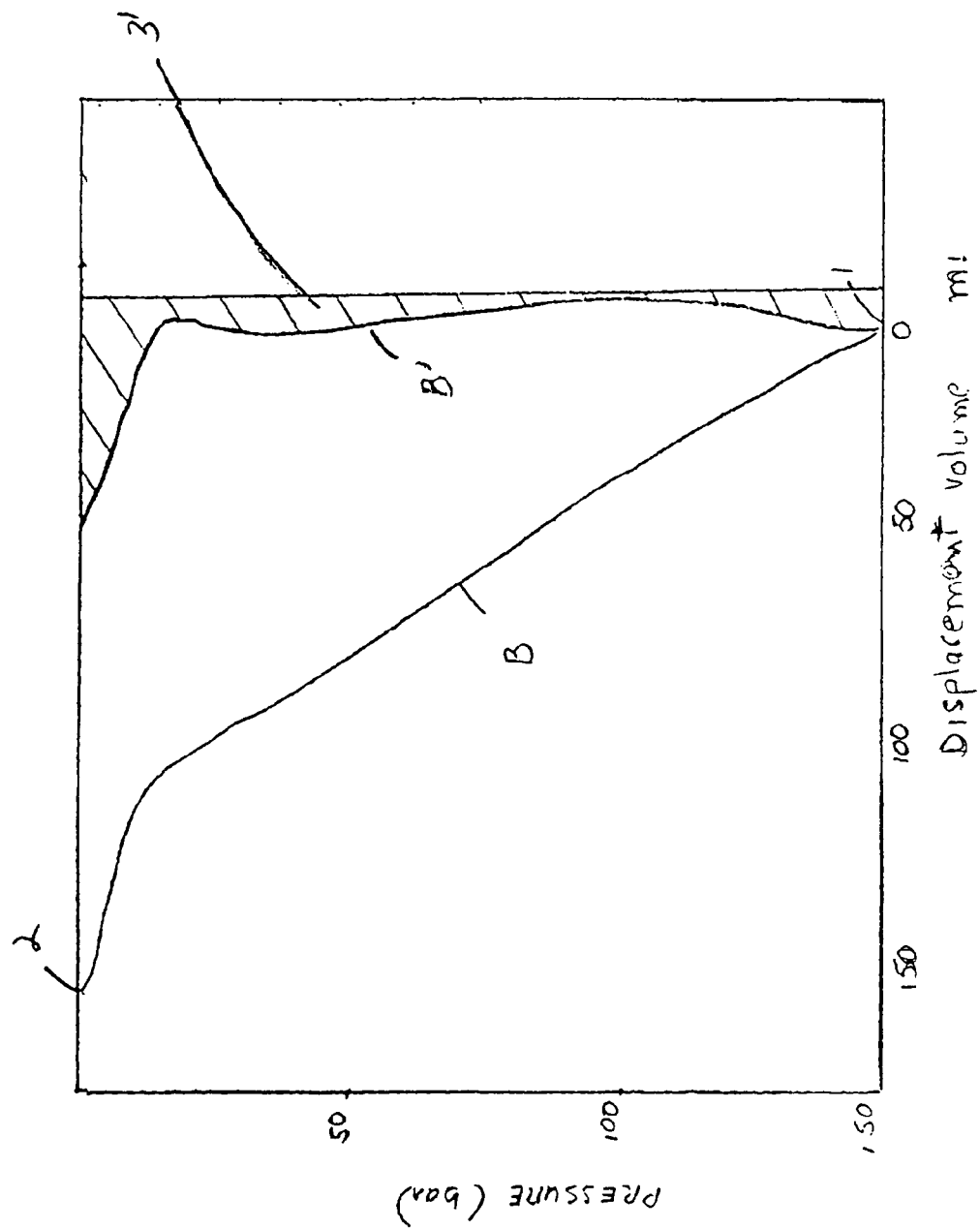
FIG. 3B illustrates graphically the change of buoyancy of a glider composite hull in comparison with an aluminum hull.

FIG. 3B illustrates a buoyancy profile comparison of a glider aluminum hull (B) and a glider composite hull (B') and is based upon a typical temperate North Atlantic ocean site in June and a glider of 50 kg displacement. The vertical axis indicates pressure (depth) in bars. The horizontal axis shows buoyancy in milliliters of water displaced. The aluminum hull buoyancy profile B uses an aluminum hull designed for 1,500 meter depth and having a compressibility of 2.3e–5 per bar of pressure. The composite hull profile B' illustrates a composite hull having a compressibility of 3.30e–5 per bar of pressure. The work 3' done for the composite hull to ascend is the hatched area above and to the right of the curve B'. As shown in FIG. 3B, the composite hull requires substantially less work than that required by the aluminum hull.

Figure 4:
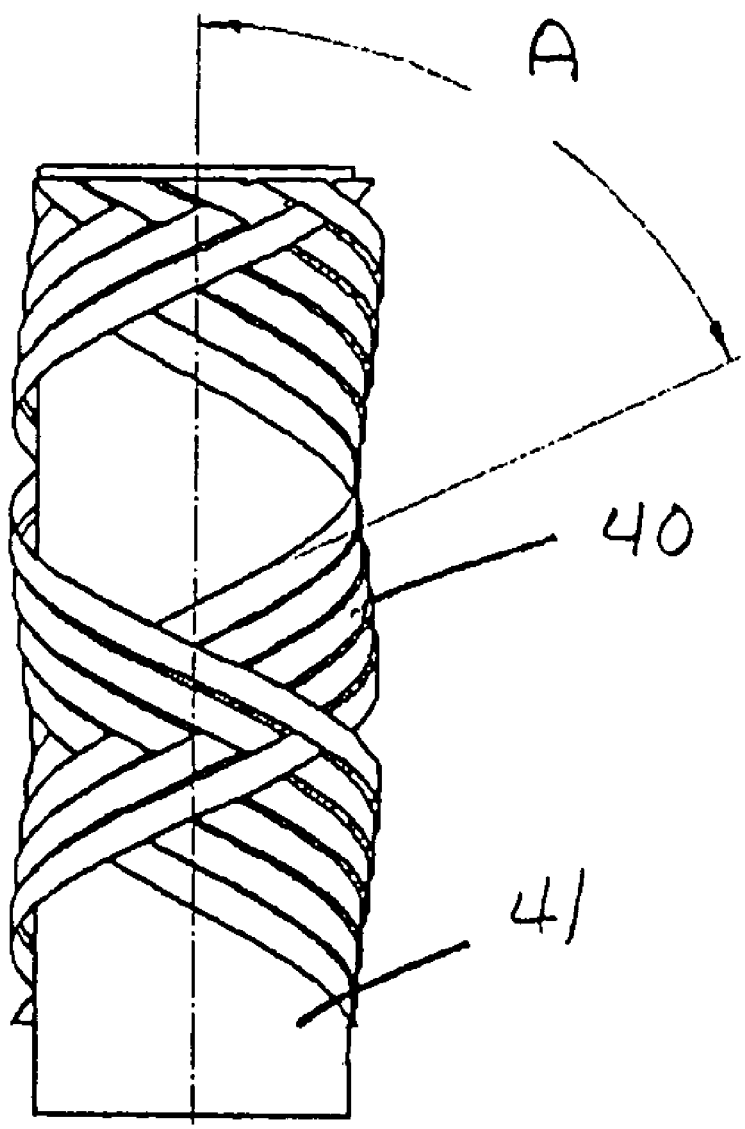
FIG. 4 details the construction of a filament wound cylinder.

FIG. 4 details the construction of a filament wound cylinder showing a partial winding. The filament bundles (called tows) 40 are shown being wound about a mandrel 41 at a winding angle A. The filaments 40 are stiff along their axis and less stiff in orthogonal directions. A cylinder wound with the filaments in a helical pattern has a different stiffness, or modulus, in the axial and circumferential directions. By adjusting the helix angle (A), the division of the load axial to the fiber and orthogonal to the fiber is controlled and a desired overall compressibility, i.e., change in volume with pressure, can be achieved.

Figure 5:
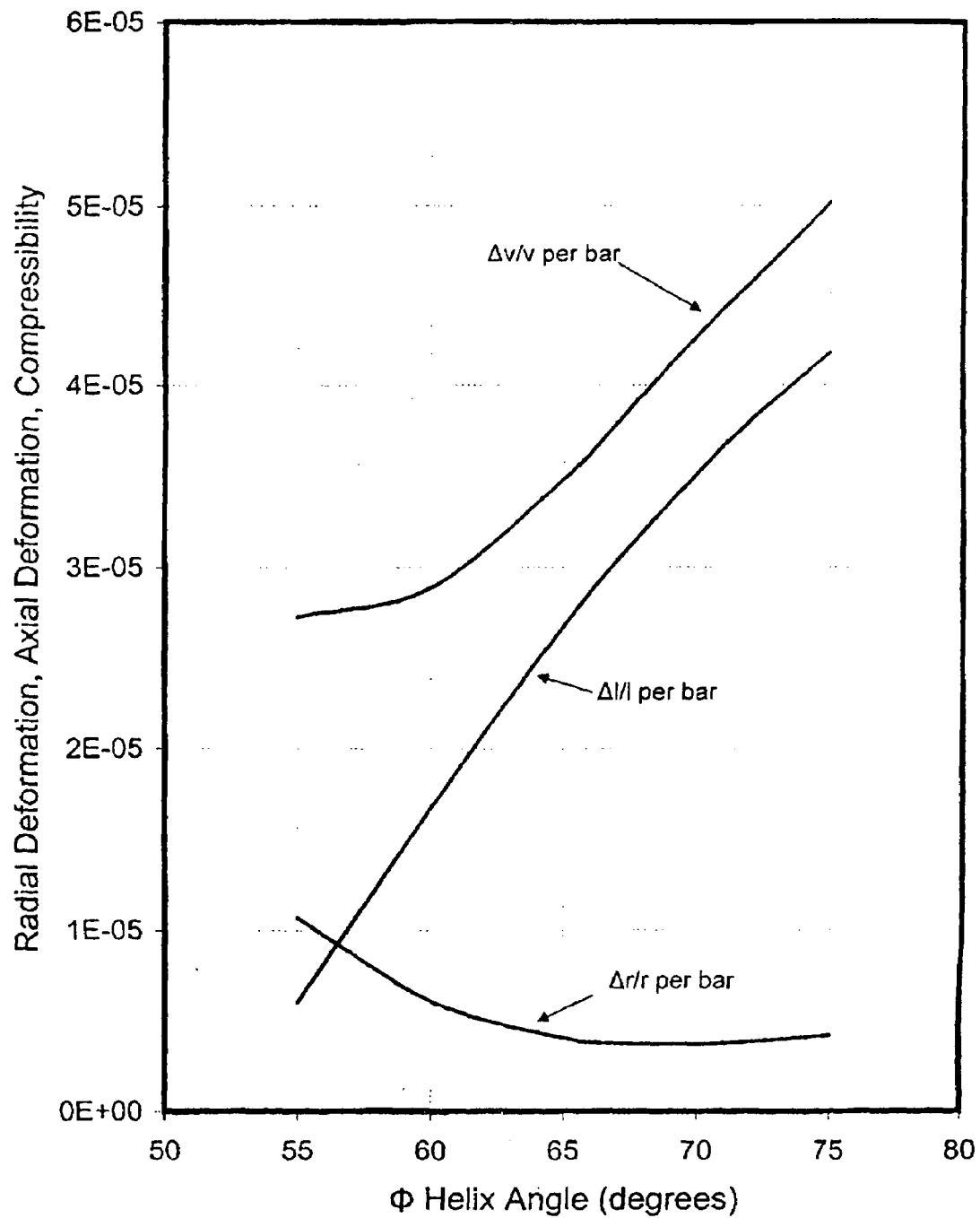
FIG. 5 illustrates radial deformation, axial deformation and compressibility versus the winding angle of a composite hull.

FIG. 5 illustrates the effect of the winding angle and resultant radial deformation, axial deformation and compressibility, where "v" (volume) represents compressibility, "l" represents axial deformation, and "r" represents radial deformation. The respective curves represent the changes in compressibility, axial deformation and radial deformation per bar of pressure as the helix angle is changed. A typical wall thickness to external diameter ratio of 0.05 is used and the predicted collapse depth is shown. While commercial graphite and epoxy is shown to quantify performance, other fibers such as glass, Kevlar, graphite, etc., can be used alone or in combination. Numerous matrix materials besides epoxy are also practical. Analytical tools and equations to accurately predict the elastic and strength capabilities of a composite hull for various filament and matrix materials and configurations are readily available.

The compressibility of water at 5 degrees C. and 2000 meters depth is approximately 4.5e–5 per bar. An aluminum hull for use at this depth has a compressibility of approximately 2.6e–5 per bar. A composite hull using graphite fibers in an epoxy resin matrix, has a hull compressibility of 2.7e–5 per bar for a helix winding at 55 degrees angle. The composite hull is lighter than the aluminum hull requiring less energy to move. The composite hull can be designed with a winding angle of 75 degrees, compressibility of 5.0e–5 per bar and a collapse depth of 3760 meters. Not only is the weight savings significant, the elastic properties of the composite hull that provides the ability to specifically tailor a hull to particular needs, allowing less total displacement and/or greater payload.

The invention has been described as a way to reduce work in an oceanic profiler, glider or similar device. The benefits accrue from improving performance by decreasing the amount of energy required for a descent/ascent cycle. The work savings may be used for increasing the number of ascent-descent cycles, reducing the size of the device, reducing pump size, reducing battery size or other energy sources stored aboard, reducing the cost of the profiler, etc.

It is understood that the above-described embodiments are merely illustrative of the application. Other embodiments may be readily devised by those skilled in the art which will embody the principles of the invention and fall within the spirit and scope thereof.

I claim:

1. A method of optimizing the compressibility and pressure resistance of an ocean submersible vehicle to minimize the work required to change depth, said vehicle having a vertical ascent and descent cycle, comprising the steps of:

forming a hollow pressure resistant hull constructed of a plurality of layers, each said layer comprising a plurality of strong and stiff linear fiber filaments embedded in a matrix;

forming each said layer by winding said filaments in a helical pattern at a desired winding helix angle, said helically wound filaments having a different stiffness in an axial and a circumferential direction;

adjusting the helix angle to obtain a division of load axial and orthogonal to the filaments to obtain a desired overall hull compressibility; and adding sequential layers.

2. The method as recited in claim 1, further comprising the step of:

selecting said winding helix angle from the range of 55 to 75 degrees.

3. The method as recited in claim 2, further comprising the step of:

selecting said fiber filaments from the group consisting of fiberglass, synthetic fibers, aramid yarns, and graphite.

4. The method as recited in claim 3, further comprising the step of:

selecting said matrix from the group consisting of epoxy resin and other resins.

5. The method as recited in claim 4, further comprising the step of:

comprising said fiber filaments embedded in a matrix as graphite filaments in an epoxy resin matrix.

* * * * *